July 17, 1962
H. BOOKMAN
3,044,568
REVERSIBLE DRIVE MECHANISM FOR MOTOR VEHICLE
Filed Oct. 2, 1959
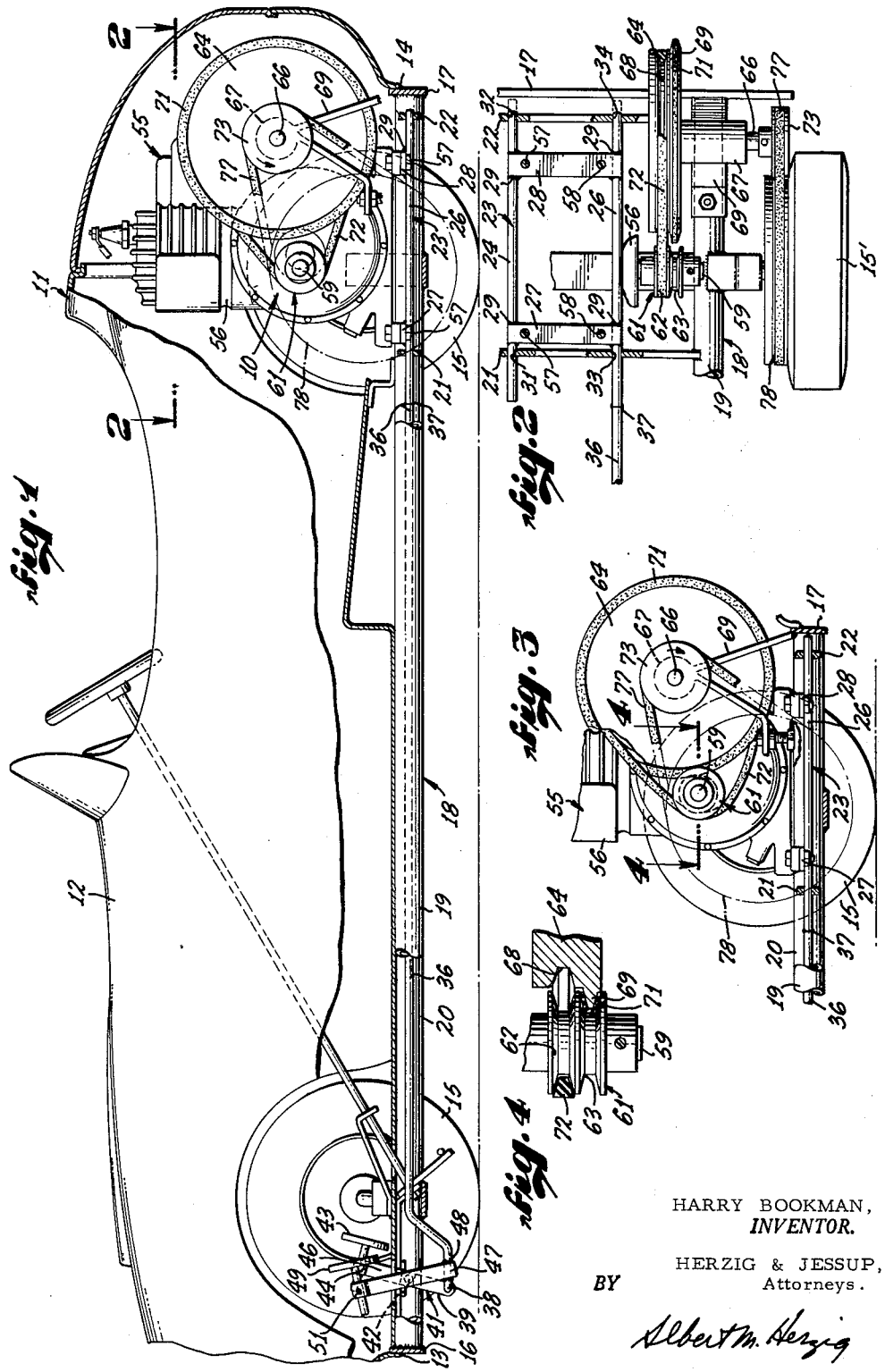
HARRY BOOKMAN,
*INVENTOR.*
BY HERZIG & JESSUP,
Attorneys.

United States Patent Office 3,044,568
Patented July 17, 1962

3,044,568
REVERSIBLE DRIVE MECHANISM FOR
MOTOR VEHICLE
Harry Bookman, 2726 Forrester Drive,
Los Angeles 36, Calif.
Filed Oct. 2, 1959, Ser. No. 844,122
2 Claims. (Cl. 180—70)

This invention relates to a reversible drive mechanism and more particularly to a drive mechanism for driving an automobile, machine or the like, in forward and in reverse directions.

In most low power, low cost vehicles, the cost of a mechanism by which the drive can be reversed has been prohibitive, and therefore impractical, and control means for reversing the drive too complicated and therefore costly.

Although this invention provides a reversible drive mechanism for an automobile, more particularly a low-speed vehicle, the drive mechanism is easily and readily adaptable for driving machines of various kinds in which a forward and reverse rotative force is required. In accordance with this invention, the power drive means, an engine, is fixed to a sliding frame for reciprocal linear movement relative to a base supporting the frame and a driven wheel. The frame is moved linearly in a direction away from the driven wheel to drive the driven wheel in one direction, and moved linearly towards the driven wheel to drive the driven wheel in an opposite direction. Discrete power transmission means are provided for translating the rotative power of the engine to rotation of the drive wheel in each direction.

It is therefore an object of this invention to provide a new and improved reversible drive mechanism for driving a vehicle or a machine in forward and reverse directions.

It is a further object of this invention to provide a new and improved reversible drive mechanism which is easily and quickly actuated for drive in forward and reverse directions.

A still further object of this invention is to provide new, improved and simplified actuating means for the reversible drive mechanism of the character described for more easily and readily actuating the drive mechanism into forward or reverse directions.

Yet another object of this invention is to provide a reversible drive mechanism which is economical to manufacture, capable of mass production and of interchangeability of parts thereof.

A general object of this invention is to provide a new and improved reversible drive means which overcomes disadvantages of prior methods and devices, formerly intended to accomplish generally similar purposes.

These and other objects of this invention will be more apparent from the following drawings, detailed description and appended claims.

In the drawings:

FIGURE 1 is a vertical, cross-sectional view, as taken substantially along the longitudinal center of a vehicle, with parts shown in elevation;

FIGURE 2 is a horizontal, cross-sectional view, as taken substantially along the line 2—2 of FIGURE 1, with parts thereof removed for greater clarity;

FIGURE 3 is a fragmentary, cross-sectional view, similar to the right portion of FIGURE 1, showing portions of the reversible drive means thereof in a changed position;

FIGURE 4 is a horizontal, cross-sectional view, taken substantially along the line 4—4 of FIGURE 3, with parts shown in elevation.

Referring in detail to the drawings, there is shown by way of illustration, but not limitation, a reversible drive mechanism, designed and constructed in accordance with this invention and generally referred to by the numeral 10. The reversible drive mechanism as illustrated herein as applied to a vehicle 11, as an example; it is to be understood, however, that the use of the mechanism 10 is not to be restricted to the example inasmuch as the invention may be applied to a variety of uses and mechanisms, such as machines, or the like.

The vehicle 11 comprises a body 12 secured, as by welding, or the like, indicated at 13 and 14, to fore and aft transverse members 16 and 17, respectively, of a chassis generally referred to in this application as a base 18. The base 18 comprises a pair of laterally-spaced, longitudinal, rigid members 19 and 20 secured to the transverse members 16 and 17, as by welding or the like. The base is supported, in this application of the invention, by a plurality of wheels 15 rotatably mounted thereon.

The base 18 further includes a pair of longitudinally-spaced transverse members 21 and 22 for slidingly supporting a frame 23 for reciprocal movement relative to the base. The frame 23 comprises a pair of laterally-spaced rod members 24 and 26 having transverse tie members 27 and 28 secured thereto as by welding or the like, indicated at 29.

The rod member 24 is slidingly disposed at its ends in aligned apertures 31 and 32 of the transverse members 21 and 22, respectively, for linear reciprocal movement relative to the base 18. The rod member 26 is similarly slidingly disposed in aligned apertures 33 and 34 of the transverse members 21 and 22, respectively. A push rod 36 is secured at one end to the member 26, as by welding, or the like, indicated at 37. An opposite end 38 of the push rod 36 is pivotally connected to a lower arm 39 of a bell crank 41 pivotally secured on the base as at 42. A foot pedal 43 is adjustably secured as at 44 to an upper arm 46 of the bell crank for manually operating the push rod 36. Rotation of the bell crank 41 by manual pressure against the foot pedal 43, to rotate the bell crank in a counter-clockwise direction as viewed in FIGURE 1, causes the lower arm 39 to pivot rearwardly to push the rod 36 rearwardly and thereby impart a rearward linear movement of the frame 23 relative to the base 18.

A link 47 is secured to the push rod, as by welding or the like, indicated at 48, and extends upwardly above the base 18. The link 47 is provided with a foot pedal 49 adjustably secured to the upper end of the link, as at 51, whereby the link 47 moves rearward with the push-rod 36 in response to the rearward movement of the push-rod to apply a rearward linear movement of the frame 23, when pedal 43 is moved forwardly. Manual pressure against the foot pedal 49 in a forwardly direction, returns the push-rod 36 forwardly to impart a forward linear movement of the frame 23 relative to the base 18, in a reverse direction to the rearward linear movement. Forward movement of the foot pedal 49 causes the bell crank to rotate and return the foot pedal 43 rearwardly.

The transverse members 27 and 28 of the frame 23 provide mounting means for a power drive means generally designated by the number 55.

The power drive means, as illustrated herein, comprises a gas-operated engine 56 mounted on the transverse members 27 and 28 as by bolts 57 extending through apertures 58 thereof, so as to position a driven shaft 59 of the engine transversely of the linear movement of the frame 23. A multiple pulley 61 is keyed, or otherwise secured, to the shaft 59 for rotation therewith, and provides at least a pair of spaced grooves 62 and 63. A driven wheel 64 is mounted for rotation with a shaft 66 rotatably supported within a bearing 67 mounted on the base 18, as by an upstanding bracket 69, the axis of the shaft 66 being substantially parallel to the axis of the drive shaft 59.

The wheel 64 includes an annular groove 68 vertically coplanar with the annular groove 62 and an enlarged rim 69 vertically coplanar with the groove 64 of the pulley 61. A band 71 of a friction material, such as rubber, neoprene, or the like, is wrapped around the rim 69 and secured thereto. The outer cross-sectional configuration of the band 71 is complementary to the cross-sectional configuration of the groove 63, as best seen in FIGURE 4, this being a V shape.

An endless friction belt 72 resides in the grooves 62 and 68 for selectively connecting the pulley 61 to the driven wheel 64.

A pulley 73 is keyed, or otherwise secured, to the shaft 66 and is connected by means of a pulley belt 77 to an enlarged pulley 78 integral with or secured to one of the wheels 15, indicated at 15', the belt 77 being constantly in tension to readily transmit rotation of the shaft 66 to the wheel 15'.

To drive the vehicle 12 forwardly, and thereby its wheels 15 and 15' in a counter-clockwise direction, the pedal 49 is actuated in a forward direction to extend the push rod 36 forwardly and thereby apply a forward linear movement to the frame 23. The forward linear movement of the frame 23 causes the engine to move linearly forwardly in a direction away from the driven wheel 64, thereby tightening the belt 72 to frictionally engage both the pulley 61, in the groove 62, and the driven wheel 64, in the groove 68, as viewed in FIGURES 1 and 2. In this position, the driven wheel 64 is driven in a rotational direction corresponding to the rotational movement of the pulley 61, that is, in a counter-clockwise direction. The rotation of the wheel 64 is transmitted by the shaft 66 to the pulley 73 to rotate the pulley 78 in a counter-clockwise direction, and thereby the wheel 15', to drive the vehicle 12 forwardly.

To reverse the direction of travel of the vehicle 12, the pedal 43 is manually actuated in a forwardly direction to rotate the bellcrank 41 and push the pushrod 36 rearwardly, thereby causing rearward linear movement of the frame 23 relative to the base 18. Rearward movement of the frame 23 carries the engine 56 rearwardly towards the driven wheel 64 to remove tension from the belt 72 and bring the groove 63 of the pulley 61 into contact with the friction periphery 71 of the rim 69, as viewed in FIGURES 3 and 4, thereby transmitting rotation of the drive shaft 59 and pulley 61 to the wheel 64, the direct contact causing the wheel 64 to rotate in an opposite direction, a clockwise direction. The rotation of the wheel 64 in a clockwise direction is transmitted to the pulley 73 to drive the pulley 78 in a clockwise direction, and thereby the wheel 15', to cause the vehicle 12 to travel in a reverse direction.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claims, so as to embrace any and all equivalent devices and methods.

What I claim as new and desire to secure by Letters Patent is:

1. In combination with a child-sized wheeled motor vehicle a reversible drive comprising: a base, a frame slidably supported on said base for reciprocatable linear movement relative to said base, power drive means secured on said frame for reciprocable linear movement therewith, said power drive means having a drive shaft extending therefrom and transversely to the direction of reciprocatable movement thereof; a driven wheel rotatably mounted on said base for rotation upon an axis parallel to the axis of rotation of said drive shaft; a first power transmission means frictionally connecting said drive shaft and said driven wheel in response to linear movement of said frame in one direction for transmitting rotation of said drive shaft into rotation of said driven wheel in one direction; a second power transmission means frictionally connecting said drive shaft and said driven wheel in response to linear movement of said frame in an opposite direction for transmitting rotation of said drive shaft into an opposite rotation of said driven wheel, each of said power transmission means being disconnected when the other is connected, manually operable means mounted on said base and connected to said frame for imparting linear movement of said frame relative to said base in selective directions, said first power transmission means including a pulley secured to said drive shaft for rotation therewith, an annular groove on said wheel, and an endless friction belt in said annular groove connecting said pulley and said driven wheel, said belt being tightened in response to linear movement of said frame in said one direction for transmitting rotation of said drive shaft to said driven wheel and loosened in response to movement of said frame in said opposite direction for disconnecting transmission of power by said belt, said second power transmission means including an enlarged rim portion on said driven wheel adjacent said annular groove, said rim portion having a friction surface on the periphery thereof, and said pulley on said drive shaft having an annular groove engageable by said rim portion, in response to movement of said frame in said opposite direction, for transmitting rotation of said drive shaft to said driven wheel in reverse direction, and disengageable from said rim portion in response to said movement of said frame in said one direction for disconnecting transmission of power in said reverse direction.

2. The combination as in claim 1, said manually operable means including a push rod having ends, one end being connected to said frame for reciprocatable linear movement of said rod with said frame, a lever pivotally mounted on said base and having one end part thereof connected to the opposite end of said push rod, and a member secured to said push rod adjacent said opposite end for linear movement with said push rod, whereby said frame is linearly movable in one direction in response to rotation of said lever in one direction and is movable in an opposite direction by a movement of said member in a direction corresponding to the movement of the end part of said lever not connected to the push rod.

References Cited in the file of this patent

UNITED STATES PATENTS

| | | |
|---|---|---|
| 819,377 | Price | May 1, 1906 |
| 828,713 | Coffman et al. | Aug. 14, 1906 |
| 2,252,871 | Sohl | Aug. 19, 1941 |
| 2,535,254 | Attwell | Dec. 26, 1950 |
| 2,583,272 | Metzler | Jan. 22, 1952 |
| 2,625,230 | Burkhardt | Jan. 13, 1953 |
| 2,773,392 | Cizek | Dec. 11, 1956 |
| 2,795,914 | Smith | June 18, 1957 |
| 2,912,871 | Velkoff | Nov. 17, 1959 |